Patented Oct. 1, 1929

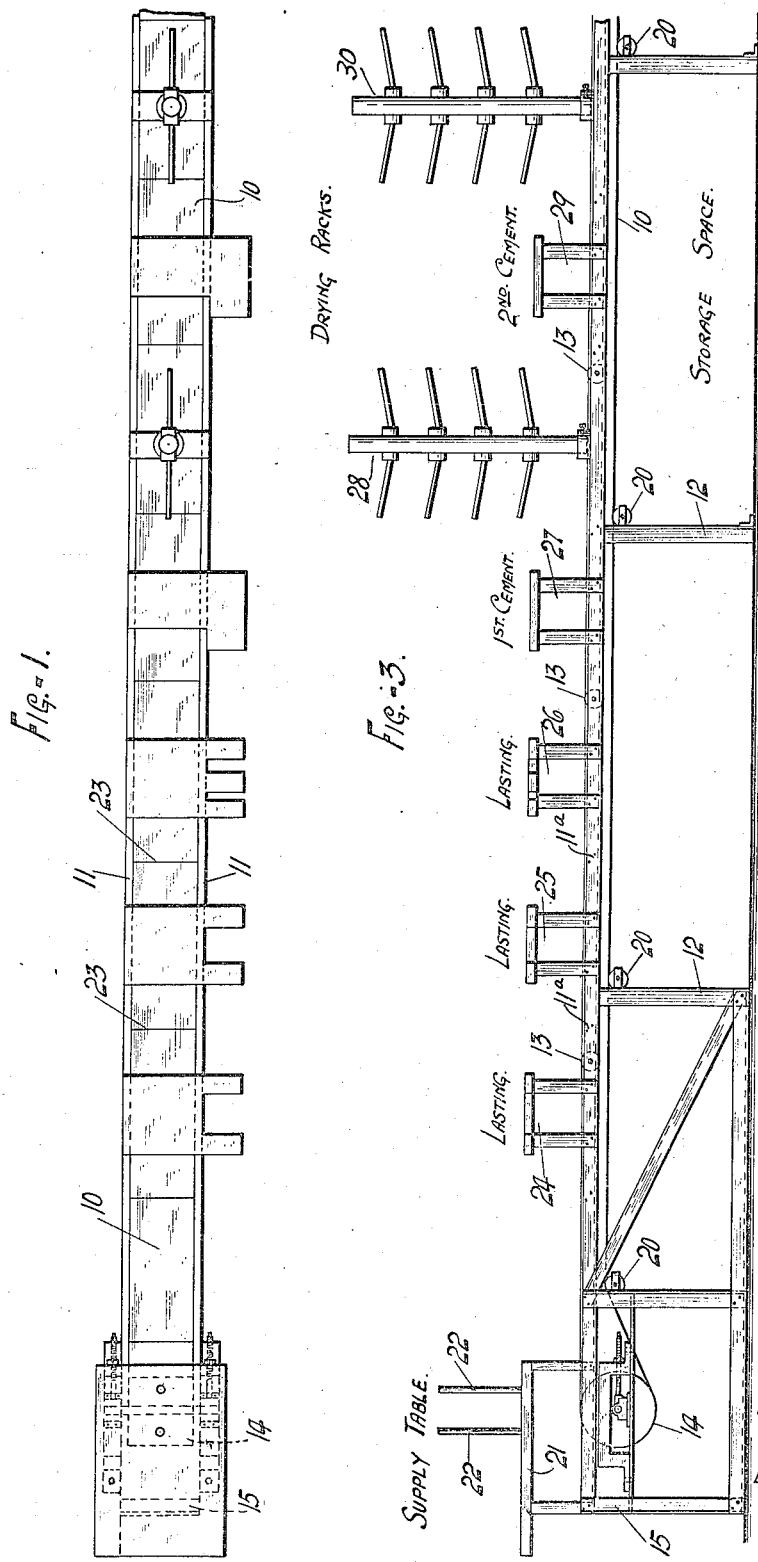

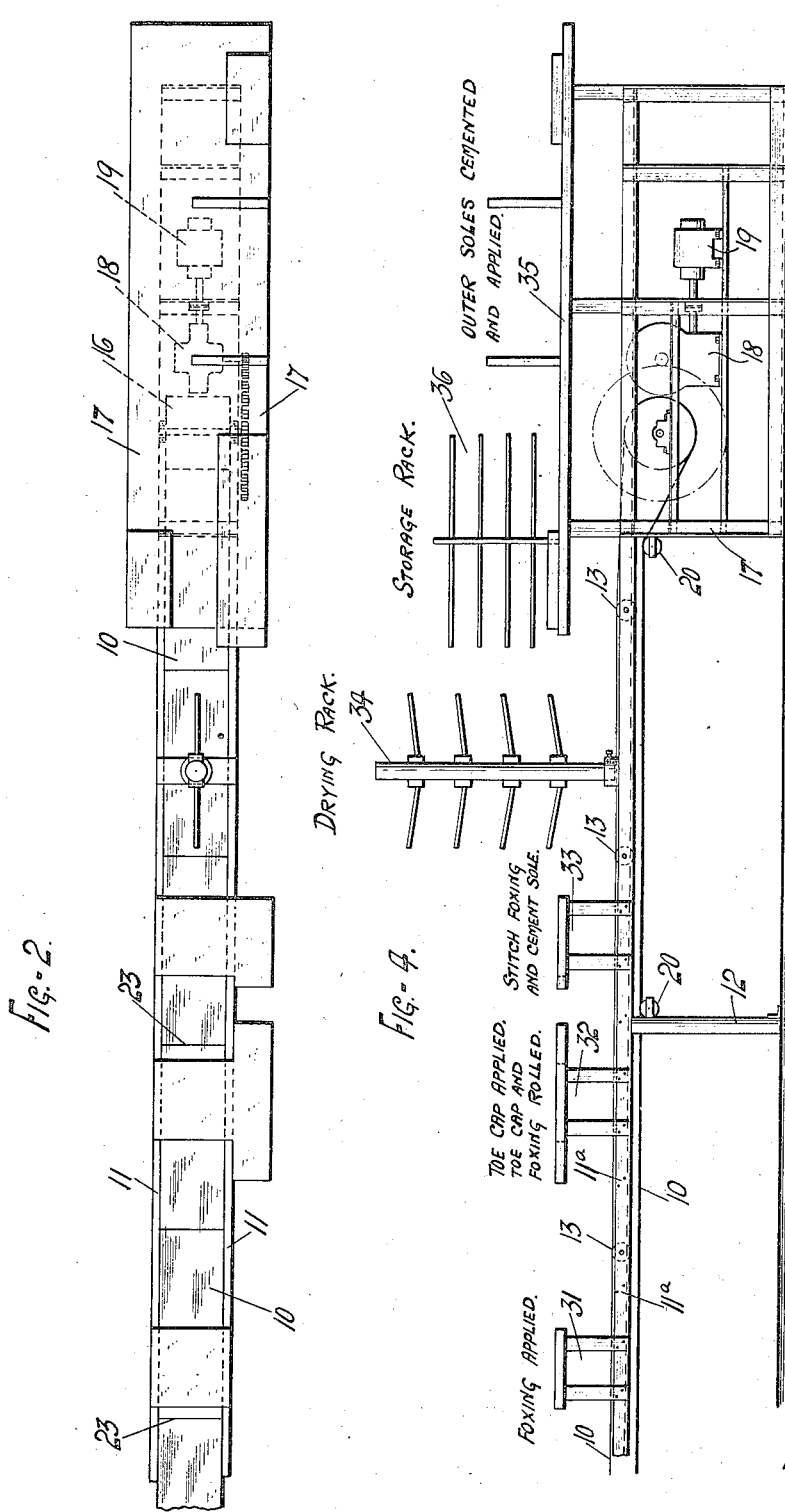

1,730,313

UNITED STATES PATENT OFFICE

WINTHROP W. BENNER, OF CUYAHOGA FALLS, OHIO, ASSIGNOR TO FIRESTONE-APSLEY RUBBER COMPANY, OF HUDSON, MASSACHUSETTS, A CORPORATION OF MASSACHUSETTS

APPARATUS FOR BUILDING RUBBER FOOTWEAR

Application filed August 14, 1925. Serial No. 50,286.

This invention relates to conveyors for use in manufacturing rubber footwear.

One object of the invention is to provide in combination with a work-timing conveyor, various instrumentalities for facilitating the shoe assembling operations, the instrumentalities to be adapted to be rearranged with respect to the conveyor for making different types of rubber footwear.

The foregoing and other objects are obtained by the construction illustrated in the accompanying drawings and described in detail below. It will be understood that the invention is not limited to the specific form thereof shown and described.

Of the accompanying drawings:

Figures 1 and 2, taken together, illustrate in plan a tennis shoe building apparatus; and Figures 3 and 4, taken together, illustrate the same in side elevation.

Referring to the drawings, 10 represents a conveyor belt arranged to travel in its upper reach between channels 11, 11, supported by legs 12, 12, and over rollers 13, 13 arranged between said channels. Belt 10 is trained over a pulley 14 adjustably mounted on frame 15, 15, at the starting end of the conveyor and over a power driven pulley 16 journaled in frame 17, 17 at the finishing end of the conveyor, pulley 16 being driven through reduction gearing 18 by a motor 19. The lower reach of belt 10 is supported on rollers 20, 20.

Mounted on channels 11 over the starting end of conveyor 10 is a supply table 21 detachably bolted thereon and in the present example having pins 22, 22 thereon on which may respectively be stacked right and left tennis shoe uppers.

Belt 10 has a series of marks 23, 23 thereon substantially equally spaced and vari-colored, or otherwise designated, in groups of two or three, that is, one mark may be black, the next white, the third red, and repeated in this order throughout the length of the belt. By this arrangement an operative at the starting end of the belt may time his placing of parts on the belt.

Detachably secured on channels 11 are a series of benches 24, 25 and 26 for three lasting operatives, each of whom may perform a lasting operation on that upper adjacent any particular mark 23 which each may select beforehand. For example, the operative at 24 may perform lasting operations on those uppers placed adjacent the black marks 23 and the operative at 25 may perform lasting operations on those uppers placed adjacent the white marks 23, etc.

At 27 a bench may be detachably secured on channels 11 for a cementing operative, who may perform the first cementing operation.

For drying the work after the first cementing operation, a rotatable rack 28 may be next detachably bolted onto channels 11, the operative at 27 placing the cemented work on the rack and an operative at a second cementing bench 29, detachably secured on channels 11, removing them therefrom and subjecting them to a second cementing operation.

A second detachable drying rack 30 is next detachably mounted on channels 11 whereby the work may be dried after the second cementing operation at bench 29.

There is next provided along the conveyor a bench 31 at which an operative may be positioned for removing the work from rack 30 and applying foxing thereto and placing on belt 10.

After the foxing applying station 31, there is arranged a bench 32 detachably mounted on channels 11 over belt 10 at which the toe cap may be applied and the toe cap and foxing rolled, the work being again returned to the belt 10 by the operative at this bench.

There is shown at 33 a bench similar to those previously described for performing further operations, such as to stitch the foxing and cement soles, the operative at this station placing the work on a rotatable drying rack at 34 which is similar to racks 28 and 30.

At the finishing end of conveyor 10, there is mounted a bench 35 on frames 17 at which the outer soles may be cemented and applied, a rack 36 being provided for cemented outer soles. At this bench various other finishing operations may also be performed.

As shown at $11^a$, $11^a$, channels 11 are provided with variously spaced bolt apertures whereby the benches and racks may be readily rearranged to convert the tennis shoe making apparatus illustrated into an apparatus for making other kinds of footwear.

It will appear from the foregoing that a simple but effective apparatus has been provided for feeding the work from one to another of specialized operatives in timed relation to maintain a steady maximum production, the various parts of the footwear being assembled on the work in progressive order, the completed footwear being delivered according to a definite schedule.

Modifications of the invention may be resorted to without departing from the spirit thereof or the scope of the appended claims.

What is claimed is:

1. An apparatus for making rubber footwear, said apparatus comprising a conveyor and having indicia thereon for timing the application of the work thereto, a series of work benches detachably and adjustably mounted over the conveyor, rotatable drying racks detachably and adjustably mounted over the conveyor between certain of said benches, and means for continuously driving the conveyor.

2. A conveyor for use in the manufacture of rubber footwear, said conveyor having indicia thereon for timing the application of work thereto, said indicia being varied in groups of two or more, and two or more operators' stations along the conveyor at each of which the same operation may be simultaneously performed by the operative on the work adjacent a particular indicium of each group.

3. Apparatus for use in manufacturing rubber footwear, said apparatus comprising a conveyor belt, channels between which the upper reach of said belt travels, and benches adapted to be detachably secured on said channels, said benches and channels having means thereon for securing the benches in various adjusted positions over the conveyor.

WINTHROP W. BENNER.